April 18, 1933.　　　F. C. ROYE　　　1,904,631
STUFFING BOX
Filed Nov. 1, 1930　　　2 Sheets-Sheet 1
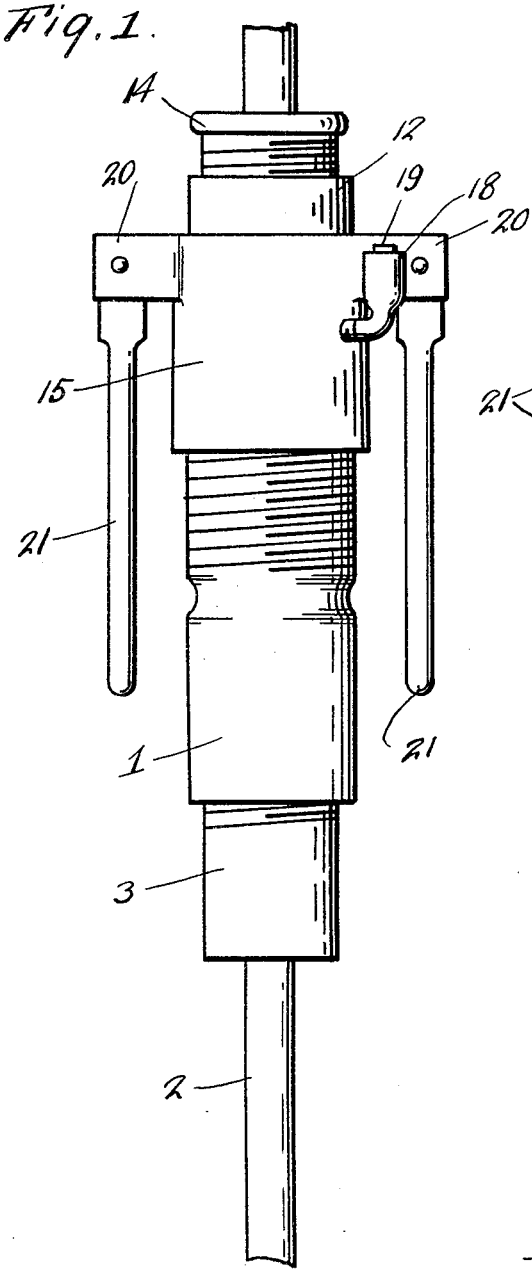
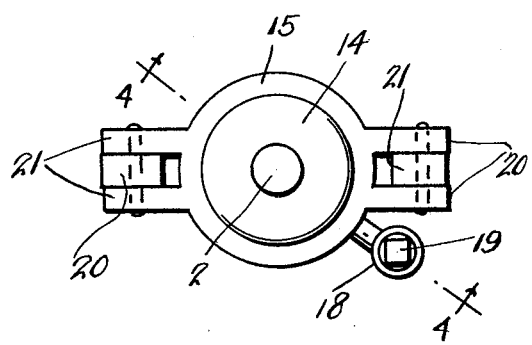
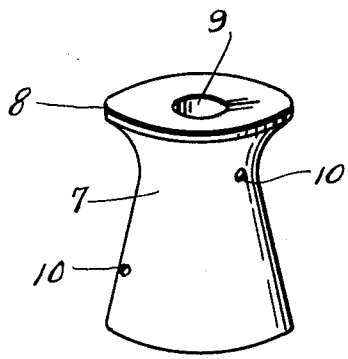
Inventor
F. C. Roye
By Clarence A O'Brien
Attorney April 18, 1933. F. C. ROYE 1,904,631
STUFFING BOX
Filed Nov. 1, 1930 2 Sheets-Sheet 2
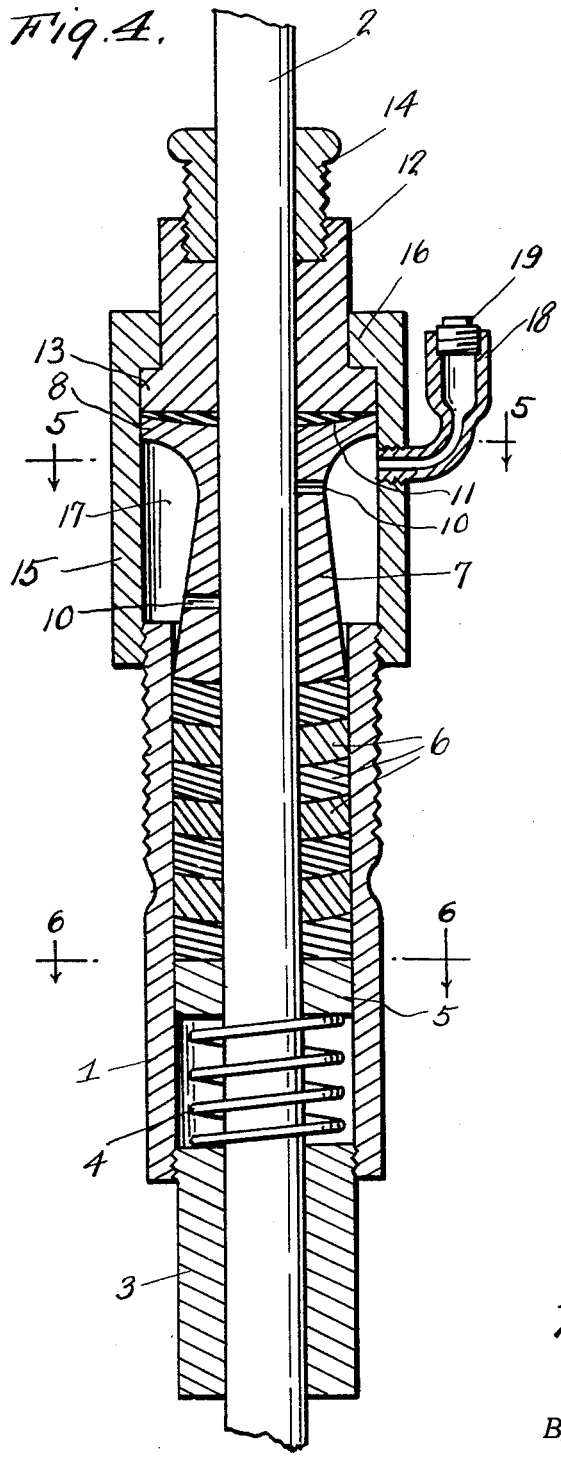
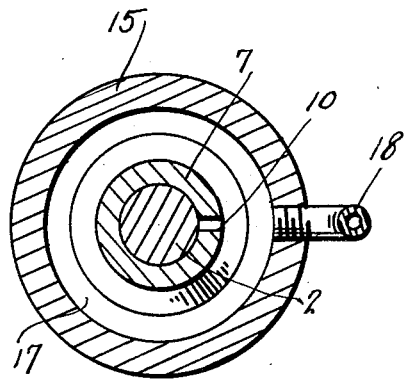
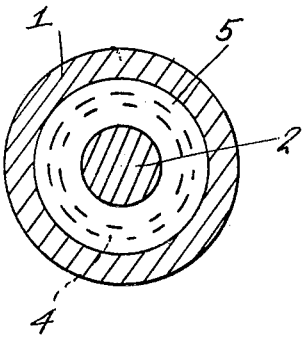
Inventor
F. C. Roye
By *Clarence A. O'Brien*
Attorney Patented Apr. 18, 1933

1,904,631

UNITED STATES PATENT OFFICE

FORREST C. ROYE, OF BURKBURNETT, TEXAS

STUFFING BOX

Application filed November 1, 1930. Serial No. 492,839.

This invention relates generally to stuffing boxes and more particularly to new and useful improvements in devices of this character which are especially adapted for use in connection with oil well pumping apparatus.

The primary object of the invention is to provide, in a manner as hereinafter set forth, a stuffing box for the polish rod of oil well pumps embodying a novel construction and arrangement of parts whereby adequate lubrication of the polish rod in the stuffing box is assured at all times.

Other objects of the invention are to provide a stuffing box of the character described which will be simple in construction, strong, durable, efficient in its use and which may be manufactured at low cost.

All of the foregoing and still further objects and advantages of the invention may become apparent from a study of the following specification, taken in connection with the accompanying drawings wherein like characters of reference designate corresponding parts throughout the several views, and wherein:—

Figure 1 is a view in elevation of a stuffing box constructed in accordance with this invention.

Figure 2 is a top plan view thereof.

Figure 3 is a detail view in perspective of the packing ring follower which is disposed in the lubricant receiving chamber of the stuffing box and which is provided with ports for the passage of the lubricant to the polish rod which passes slidably through said follower.

Figure 4 is a vertical sectional view taken substantially on the line 4—4 of Figure 2.

Figure 5 is a horizontal sectional view taken substantially on the line 5—5 of Figure 4.

Figure 6 is a horizontal sectional view taken substantially on the line 6—6 of Figure 4.

Referring to the drawings in detail it will be seen that the stuffing box constituting this invention comprises the cylinder 1 which is externally threaded at its upper end portion and which is internally threaded at its lower end portion. The cylinder 1 is of uniform internal diameter throughout and is open at its upper and lower ends. The reference numeral 2 designates the polish rod which extends slidably through the stuffing box. A plug 3 is threaded into the lower end portion of the cylinder 1 and the polish rod 2 extends slidably through said plug 3. A coil spring 4 encircles the polish rod 2 in the lower portion of the cylinder 1 and rests on the upper end of the plug 3. A disk 5 is slidably mounted on the polish rod 2 within the cylinder 1 and rests on the upper end of the coil spring 4. Packing rings 6 are disposed around the polish rod 2 in the cylinder 1 above the disk 5, said rings being formed of suitable compressible material.

A follower 7 extends slidably into the upper portion of the cylinder 1 and is engaged on the uppermost of the packing rings 6. As best seen in Figures 3 and 4 of the drawings, the major portion of the follower 7 is of substantially frusto-conical shape which merges into the integral flange 8 which constitutes the upper end portion of the follower. The follower 7 is provided with a central bore 9 for the passage of the polish rod 2 and said follower is further provided with a plurality of transverse ports 10 which communicate with the bore 9. The upper end of the follower 7 is concave as best seen in Figure 4 for the reception of a disk 11 of suitable compressible material.

A bushing 12 is disposed on the top of the compressible disk 11 and is provided with a central bore through which the polish rod 2 slidably passes. A flange 13 is formed on the lower end portion of the bushing 12, said flange being of a diameter equal to the diameter of the flange 8 of the bushing 7. The upper end portion of the bushing 12 has formed therein a threaded recess for the reception of the annulus 14 through which the polish rod 2 also slidably passes.

A clamping thimble 15 is threaded for adjustment on the upper end portion of the cylinder 1 and is provided with an internal flange 16 on its upper end for engagement on the flange 13 of the bushing 12. It will thus be seen that the outer periphery of the body portion of the follower 7 is spaced from the clamping thimble 15 and a lubricant receiving chamber 17 is provided. The periphery of the flange or head portion 8 of the follower 7 is engaged with the inner periphery of the clamping thimble 15. An oil cup 18 is threaded into the clamping thimble 15 for supplying oil to the chamber 17. A closure plug 19 is threaded into the oil cup 18.

The clamping thimble 15 is provided on diametrically opposite side of its upper end portion with the pairs of lugs or arms 20 between which pairs the usual rods 21 are pivotally mounted. The elements 20 and 21 are conventional on stuffing boxes of this general character and, therefore, constitute no part of this invention.

The lubricant passes from the chamber 17 through the ports 10 in the follower 7 to the polish rod 2 and in this manner said polish rod will be effectively lubricated so long as the supply of oil in the chamber 17 is maintained. The packing rings 6 are compressed between the follower 7 and the disk 5 which is urged yieldingly upwardly by the coil spring 4. The coil spring 4 constantly exerts pressure on the packing rings and this pressure is increased or decreased by threading the clamping thimble 15 up or down on the cylinder 1 in a manner to shift the follower 7 longitudinally in said cylinder, as will be apparent.

It is believed that the many advantages of a stuffing box constructed in accordance with this invention will be readily understood, and although the preferred embodiment of the invention is as illustrated and described, it is to be understood that changes in the details of construction may be had which will fall within the scope of the invention as claimed.

What is claimed is:—

A stuffing box for a polish rod comprising a casing, a cylinder connected to the lower end of the casing, a closure member passing through the top of the casing and having its lower face flat, a follower located in the casing with its lower end fitting in the top of the cylinder, said follower tapering upwardly and having a flange at its upper end the periphery of which contacts the inner wall of the casing with the top part of the follower of concaved shape, a packing located between the concave face of the follower and the flat lower face of the closure member, a polish rod passing thru the closure member, the follower and through the cylinder, packing means in the cylinder, a spring in the cylinder for pressing the packing means against the lower end of the follower and said follower having ports therein for leading lubricant in the casing to that part of the rod which passes through the follower.

In testimony whereof I affix my signature.

FORREST C. ROYE.